(12) United States Patent
Horie et al.

(10) Patent No.: US 6,434,274 B1
(45) Date of Patent: Aug. 13, 2002

(54) IMAGE CAPTURING DEVICE PROVIDED WITH FOCUSING SYSTEM

(75) Inventors: Mikio Horie, Saitama-ken; Minoru Suzuki, Tochigi-ken, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/179,606

(22) Filed: Oct. 27, 1998

(30) Foreign Application Priority Data

Oct. 28, 1997 (JP) .............................. 9-311172

(51) Int. Cl.$^7$ .............................. G06K 9/40; H04N 1/46
(52) U.S. Cl. ....................... 382/274; 358/509
(58) Field of Search ................. 358/509, 516, 358/520, 475, 480; 382/274

(56) References Cited

U.S. PATENT DOCUMENTS 5,353,091 A * 10/1994 Ishida ...................... 354/410
6,031,892 A * 2/2000 Karellas ................... 378/98.3

FOREIGN PATENT DOCUMENTS

| JP | 08159725 A | * 6/1996 | .......... G01B/11/24 |
| JP | 10267856 A | * 10/1998 | .......... G01B/11/24 |
| JP | H11133296 A | * 5/1999 | .......... G02B/7/28 |
| JP | 11258113 A | * 9/1999 | .......... G01M/11/06 |

* cited by examiner

Primary Examiner—Jerome Grant, II
(74) Attorney, Agent, or Firm—Greenblum & Bernstein, P.L.C.

(57) ABSTRACT

Disclosed is a focusing system for a scanner. The focusing system utilizes an imaging lens and a line image sensor of the scanner. The focusing system is further provided with a lens drive system, a contrast data detecting system that detects a contrast data representing brightness gradient with respect to a pixel located in a predetermined area on said line image sensor. Further, a lens position detecting system is provided. The lens position detecting system detects, among all lens positions, a position at which a brightness gradient of a certain pixel is greatest. Then, a controller controls the lens drive system to locate the lens to the detected lens position.

9 Claims, 13 Drawing Sheets

IMAGE CAPTURING DEVICE PROVIDED WITH FOCUSING SYSTEM

BACKGROUND OF THE INVENTION

The present invention relates to an image capturing device for capturing a two-dimensional image of an object, and more particularly to an image capturing device provided with a focusing system which brings an imaging lens to an in-focus position.

Conventionally, various camera-like image reading devices have been suggested. A typical example of such an image reading device is provided with a line image sensor which is driven to move in a direction perpendicular to the direction in which the line image sensor extends. Generally, in such an image reading device, a distance to the object is not fixed. In order to obtain an in-focus image of the object, it is necessary to obtain information related to the object distance, and an imaging lens of the image reading device is to be located at an in-focus position.

In cameras using photographing film, an automatic focusing system is generally provided. As the automatic focusing system, an active system utilizing infrared light or a passive system which detects the focusing condition in accordance with a phase difference or a difference of contrast of images is known. Based on the data related to the object obtained by the active or passive system, the automatic focusing system drives a focusing lens to an appropriate position so that the in-focus image is formed on the photographing film.

In the conventional image reading system utilizing the line image sensor, it is difficult to obtain the data related to the object distance based on the phase difference or contrast distribution using the imaging optical system and the image sensor. Thus, in the conventional image reading system, the automatic focusing system as employed in the cameras should be provided separately from the image capturing system. Since the separate focusing system is to be accommodated, the image reading devices have been prevented from being made compact.

SUMMARY OF THE INVENTION

It is therefore an objet of the invention to provide an improved image capturing device which is capable of using an image reading system for capturing system as a passive type focusing system, and detecting an in-focus position of the imaging lens accurately even if light illuminating the object fluctuates.

For the above object, according to the invention, there is provided a focusing system of a scanner, which is provided with an imaging lens; a line image sensor having a plurality of pixels arranged in a line for capturing a one-dimensional image; a lens drive system that drives the imaging lens with respect to the image sensor within a predetermined movable range; a contrast data detecting system that detects a contrast data representing brightness gradient with respect to a pixel located in a predetermined area on the line image sensor; a lens position detecting system that controls the lens drive system to sequentially change a position of the imaging lens within the predetermined movable range and controls the contrast data detecting system to repeatedly detects contrast data at each position of the imaging lens, the lens position detecting system detects a pixel with respect to which the brightness gradient is greatest and a lens position when the brightness gradient of the pixel is greatest; and a controller that controls the lens drive system to locate the imaging lens at the position detected by the lens position detecting system.

With this focusing system, even if an object to be scanned by the scanner is illuminated by a light source such as a fluorescent lamp, the focusing condition can be detected accurately based on the contrast data. Accordingly, a relative distance between the image sensor and the imaging lens can be accurately adjusted such that an in-focus image is formed on the image sensor.

In particular, the lens drive system may move only the imaging lens in a direction of an optical axis of the imaging lens to adjust the focusing condition.

Optionally, the lens drive system may move the imaging lens stepwisely at a predetermined pitch from a first end to a second end within the movable range of the imaging lens.

Further, the first end may be a near end point of the imaging lens, and the second end may be a far end point of the imaging lens.

Further optionally, the brightness gradient with respect to a pixel is a difference between brightness values of two pixels adjacent to the target pixel, and the contrast detecting system detects the brightness gradient only when brightness values of the pixel and the two adjacent pixels change (i.e., increase or decrease) monotonically.

Still optionally, the lens position detecting system may include a brightness gradient data memory for storing a brightness gradient value, a pixel with respect to which the brightness gradient value is detected, and a position at which the brightness gradient value is detected, for each of a predetermined number of brightness values whose values are greater than the other of brightness gradient values which have been detected, and the lens position detecting system detects a position of the imaging lens at which the brightness gradient value is the greatest as the in-focus position of the imaging lens.

According to another aspect of the invention, there is provided a scanner, which is provided with an imaging lens; a line image sensor having a plurality of pixels arranged in a line for capturing a one-dimensional image; a lens drive system that drives the imaging lens with respect to the image sensor within a predetermined movable range; a contrast data detecting system that detects a contrast data representing brightness gradient with respect to a pixel located in a predetermined area on the line image sensor; a lens position detecting system that controls the lens drive system to sequentially change a position of the imaging lens within the predetermined movable range and controls the contrast data detecting system to repeatedly detects contrast data at each position of the imaging lens, the lens position detecting system detects a pixel with respect to which the brightness gradient is greatest and a lens position when the brightness gradient of the pixel is greatest; a controller that controls the lens drive system to locate the imaging lens at the position detected by the lens position detecting system; a rotatable mirror provided between the object and the imaging lens, the rotatable mirror being rotatable about an axis extending in a direction parallel to a direction in which the plurality of pixels are arranged. In this scanner, light from a part of the object is reflected by the rotatable mirror and incident on the image sensor through the imaging lens, two-dimensional image of the object being captured as the rotatable mirror is rotated.

Optionally the lens position detecting system detects the position of the imaging lens with the rotatable mirror located at a predetermined reference position.

Specifically, the predetermined-reference position of the rotatable mirror is a position at which an optical axis of the imaging lens intersects a reflection surface of the rotatable mirror at 45 degrees.

DESCRIPTION OF THE ACCOMPANYING DRAWINGS

FIG. 1 is a perspective view of a camera-type scanner according to an embodiment of the invention;

FIG. 2 schematically shows an optical system of the camera-type scanner shown in FIG. 1;

DESCRIPTION OF THE EMBODIMENT

Hereinafter, an image reading device, or a camera-type scanner according to an embodiment of the invention will be described with reference to the accompanying drawings.

Figure 1:
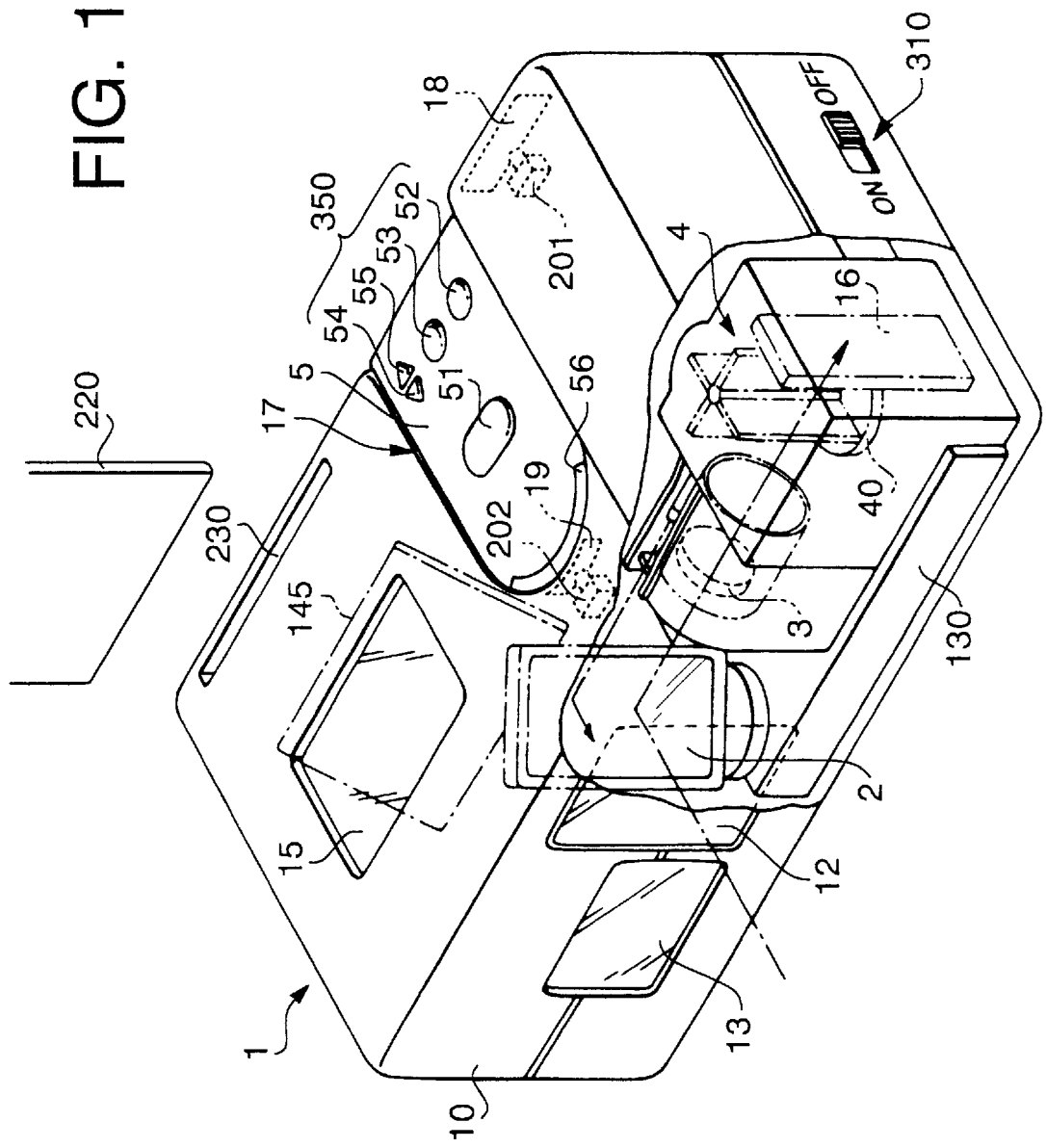

FIG. 1 is a perspective view of a camera-type scanner 1 (hereinafter referred to as a scanner 1) The scanner 1 is a camera type scanner for capturing an object image (i.e., for creating a digital image of an object) using an image sensor 16. The image sensor 16 is a monochromatic CCD (Charge Coupled Device) line sensor having a plurality of pixels arranged in a line. With use of the image sensor 16, an object apart from the scanner 1 is scanned and a two-dimensional image of the object is captured.

Figure 2:
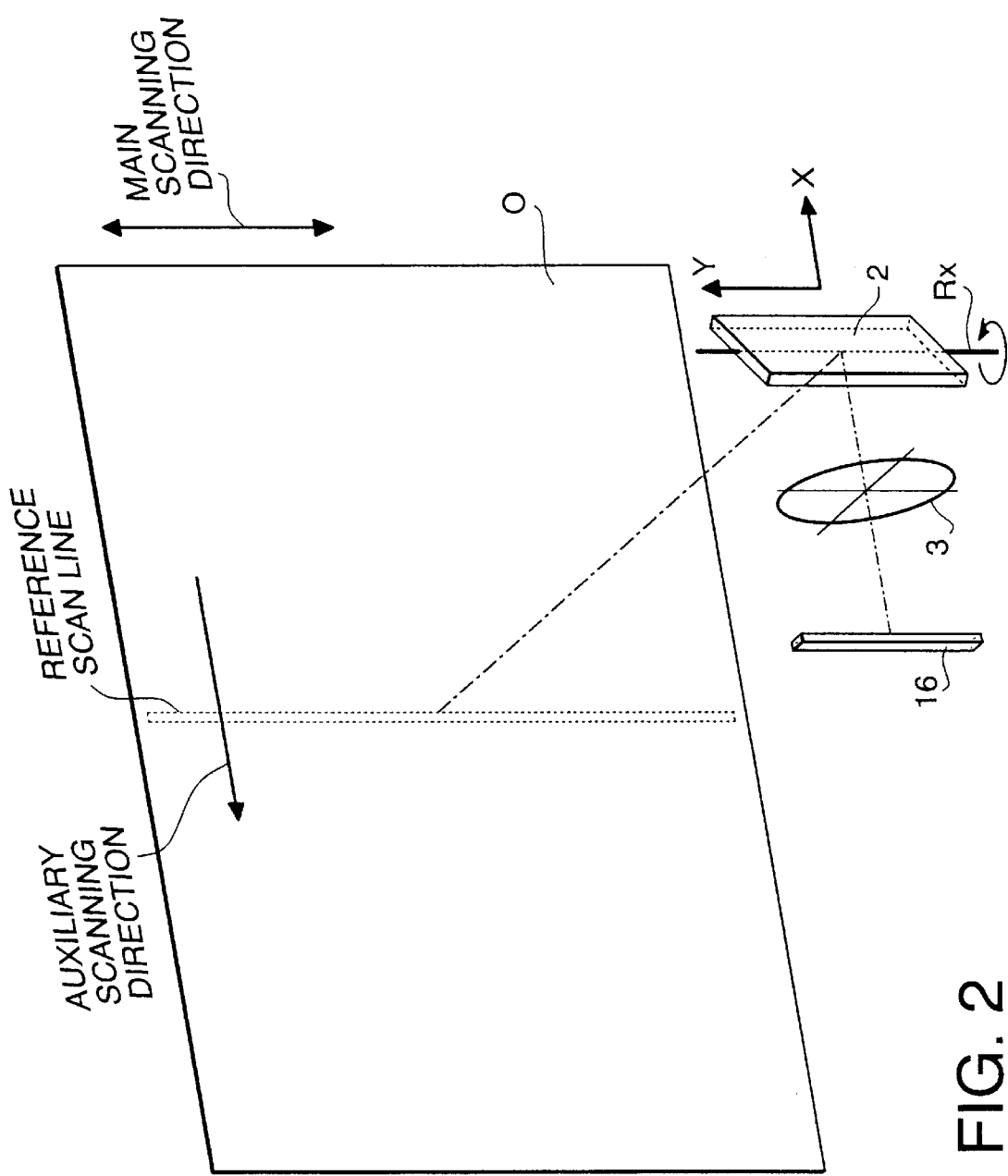

FIG. 2 shows a schematic configuration of imaging optical system of the scanner 1. The imaging optical system includes, in order along a path of light from the object, a scanning mirror 2, an imaging lens 3, and the image sensor 16. The image sensor 16 is secured to a box-shaped body 10 of the scanner 1 (see FIG. 1), while the scanning mirror 2 is made rotatable about an axis Rx which is parallel with a direction in which the image sensor 16 extends. As shown in FIG. 2, a portion (i.e., an elongated area) of an object O is directed via the scanning mirror 2 to the image sensor 16. The elongated area will also be referred to as a scan line hereinafter. As the image sensor 16 is rotated, the scan line from which the light is directed to the image sensor 16 moves in a direction perpendicular to the scan line extends, so that a two-dimensional image of the object can be captured.

In this specification, the direction in which the pixels (i.e., the light receiving elements) of the image sensor 16 are arranged is referred to as a main scanning direction, and a direction in which the scan line moves is referred to as an auxiliary scanning direction. In the drawings, an axis Y which is parallel to the direction in which the pixels of the image sensor 16 are arranged, and an axis X which is parallel to the optical axis of the imaging lens 3 are defined. In the following description., as indicated by a dotted line in FIG. 2, the scan line when the optical axis of the imaging lens 16 intersects the scanning mirror 2 at 45 degrees will be referred to a reference scan line, and the position of the scanning mirror 2 when the optical axis of the imaging lens 16 intersects the scanning mirror 2 at 45 degrees will be referred to as a reference or home position of the scanning mirror 2.

Since the image of the object O is obtained by scanning, it is possible to capture a high-density image. In the embodiment, the effective number of the pixels of the image sensor 16 is 2088, and a scanning range (angular range) is 54.4 degrees which includes 2870 scan lines. To capture image of 2870 scan lines, rotational positions of the scanning mirror 2 corresponding to the scanning range is divided into 2870 steps and rotation thereof is controlled in accordance with the divided steps. Accordingly, the resolution of the scanner 1 corresponds to a resolution using an area sensor having 2088×2870 pixels (i.e., approximately 6,000,000 pixels). This resolution corresponds to 300 dpi if an object having maximum dimensions of approximately 240 mm×180 mm positioned at 23 cm from the scanner 1.

Since the rotatable scanning mirror 2 is used for scanning, light incident on the imaging lens 3 at a predetermined incident angle is directed to the image sensor 16, the diameter of the-imaging lens 3 can be made relatively small.

Further, since the rotatable scanning mirror 2 is used, it is not necessary to move the line sensor and the mirror in a direction perpendicular thereto, a movable mechanism can be made compact and simplified.

As shown in FIG. 1, the scanner 1 has the box-shaped body 10. In front of the body 10, a window 12 for introducing light from the object is formed. Inside the body 10, the image sensor 16, the scanning mirror 2 rotatable about the axis Rx, and the imaging lens 3 for converging the light reflected by the scanning mirror 2 onto the image sensor 16 are provided.

The image sensor 16 is a monochrome type CCD line sensor. In order to allow a color image to be captured, a color filter unit 4 is inserted within an optical path between the image sensor 16 and the scanning mirror 2. It should be noted that a color CCD may also be used instead of the monochrome type CCD. Next to the window 12, a finder window 13 is formed The body 10 is further provided with a main switch 310 for powering ON and OFF the scanner 1. In this embodiment, operations other than the operation to power ON and OFF are performed by operating operation buttons 350 provided on a remote controller 5. The operation buttons 350 include a start button 51, an UP/TELE button 54, a DOWN/WIDE button 55, a MODE button 53 and a STOP/DELETE button 52. The remote controller 5 is detachably connected to a remote controller recess 17 formed on an upper portion of the body 10.

The remote controller 6 has a signal sending portion 56 for emitting infrared light using an LED (Light Emitting Diode) representing predetermined commands. The body 10 is provided with a first signal receiving unit 201 which receives infrared light from the remote controller 5. Further, on the recess 17, at a position corresponding to the signal sending portion 56 of the remote controller 5, a second signal receiving unit 202 is provided. Both the first and second signal receiving units 201 and 202 are infrared light sensors, and the second signal receiving unit 202 has lower sensitivity than the first signal receiving unit 201.

When the remote controller 17 is detached from the recess 17, the signal transmitted from the signal sending portion 56 is received by the first signal receiving unit 201, while, when the remote controller 5 is attached to the recess 17, the signal transmitted from the signal sending portion 56 is received by the second signal receiving unit 202.

Although it is not shown in the drawings, a remote controller sensor is provided at the insertion portion 17 to detect whether the remote controller 5 is attached to the recess 17. According to the embodiment, different operations are executed in response to the same signal transmitted from the remote controller 5 depending on whether the remote controller 5 is attached to the insertion portion 17 or detached therefrom.

Figure 3:
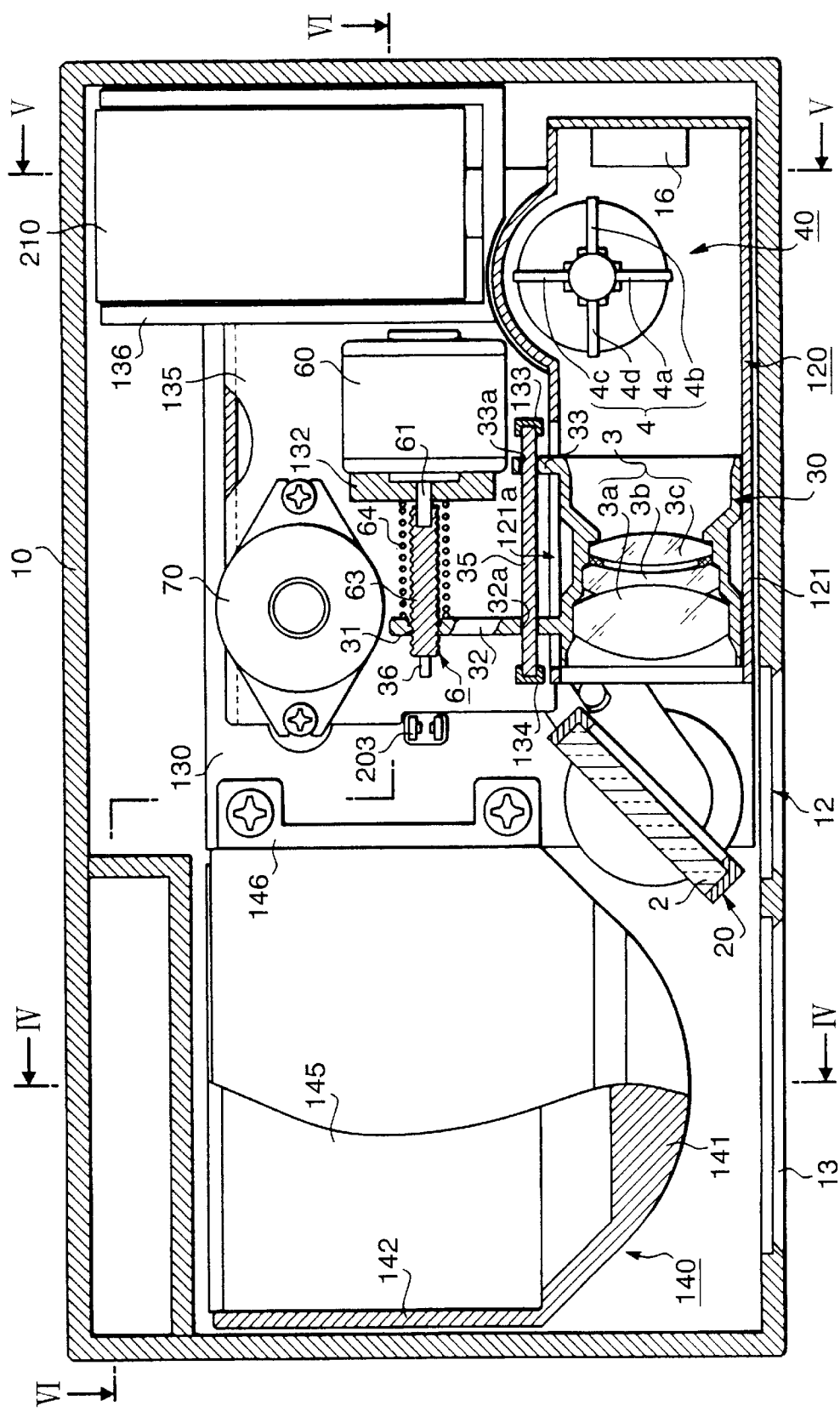
FIG. 3 is a plan view showing an internal structure of the camera-type scanner showing FIG. 1;FIG.

FIG. 3 is a plan view showing a schematic internal structure of the scanner 1.

In the body 10, a mirror holder 20 for supporting the scanning mirror 2 is provided. The mirror holder 20 is rotated, in clockwise or counterclockwise direction in the view of FIG. 3, by a mirror driving mechanism, which will be described later. Adjacent to the mirror holder 20, a housing 120 for accommodating the imaging lens 3 and the image sensor 16 is provided. The light incident from the object and reflected by the scanning mirror 2 passes through the imaging lens 3 accommodated in the housing 120 and is incident on the image sensor 16.

The imaging lens 3 includes three lens elements 3a, 3b and 3c held by a lens barrel 30 The outer circumferential of the lens barrel 30 is held by an inner circumferential of a barrel holder 121 which is also provided in the housing 120. The lens barrel 30 is driven to move close to or away from the scanning mirror 3 by a lens driving mechanism 6 so that focusing condition of the imaging lens 3 is adjusted.

In the housing 120, between the barrel holder 121 and the image sensor 16, the color filter unit 4 including a non-color filter 4a, a red filter 4b, a green filter 4c and a blue filter 4d is provided. The color filter unit 4 is held by a filter holder 40, which is rotatable about an axis that is parallel to the direction in which the pixels of the image sensor 16 are arranged, radially and at 90 degrees with respect to each other such that the filters 4a, 4b, 4c and 4d are selectively inserted in the optical path between the imaging lens 3 and the image sensor 16.

The mirror holder 20 and the housing 120 are supported by a frame 130 provided at a lower portion of the body 10. Further, a motor frame for supporting a scanning motor 70, a battery frame 136 for supporting a battery 210 are supported by the supporting frame 130.

Figure 4:
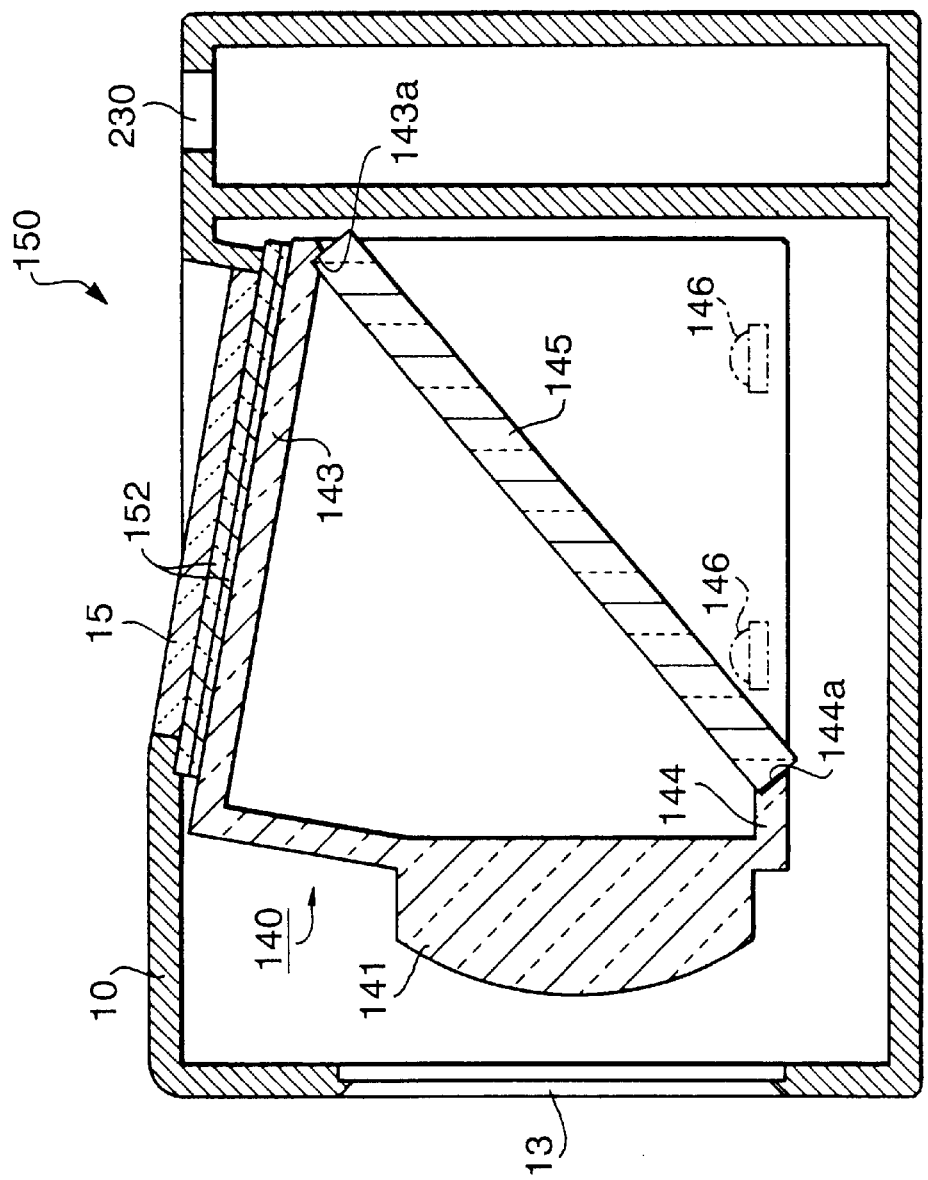
FIG. 4 is a cross-sectional view taken along a line IV—IV in FIG. 3.

FIG. 4 is a sectional view taken along a line IV—IV of FIG. 3. As shown in FIG. 4, the finder system 150 includes a finder window 13, an objective lens 141, a finder mirror 145, a Fresnel lens 143, a cover glass 15 and an LCD (Liquid Crystal Display) panel 152. The objective lens 141 and the Fresnel lens 143 are unitarily formed as a lens unit 140, which is fixed on the support frame 130 via bolts at two fixing portions 146 (see FIG. 3).

Behind a portion where the finder is provided, as shown in FIG. 1, a card slot 230 to which a memory card 220 is inserted is formed.

Next, a mirror driving mechanism 7 will be described. The mirror driving mechanism 7 rotates the scanning mirror 2 and also switches the filters 4a–4d.

Figure 5:
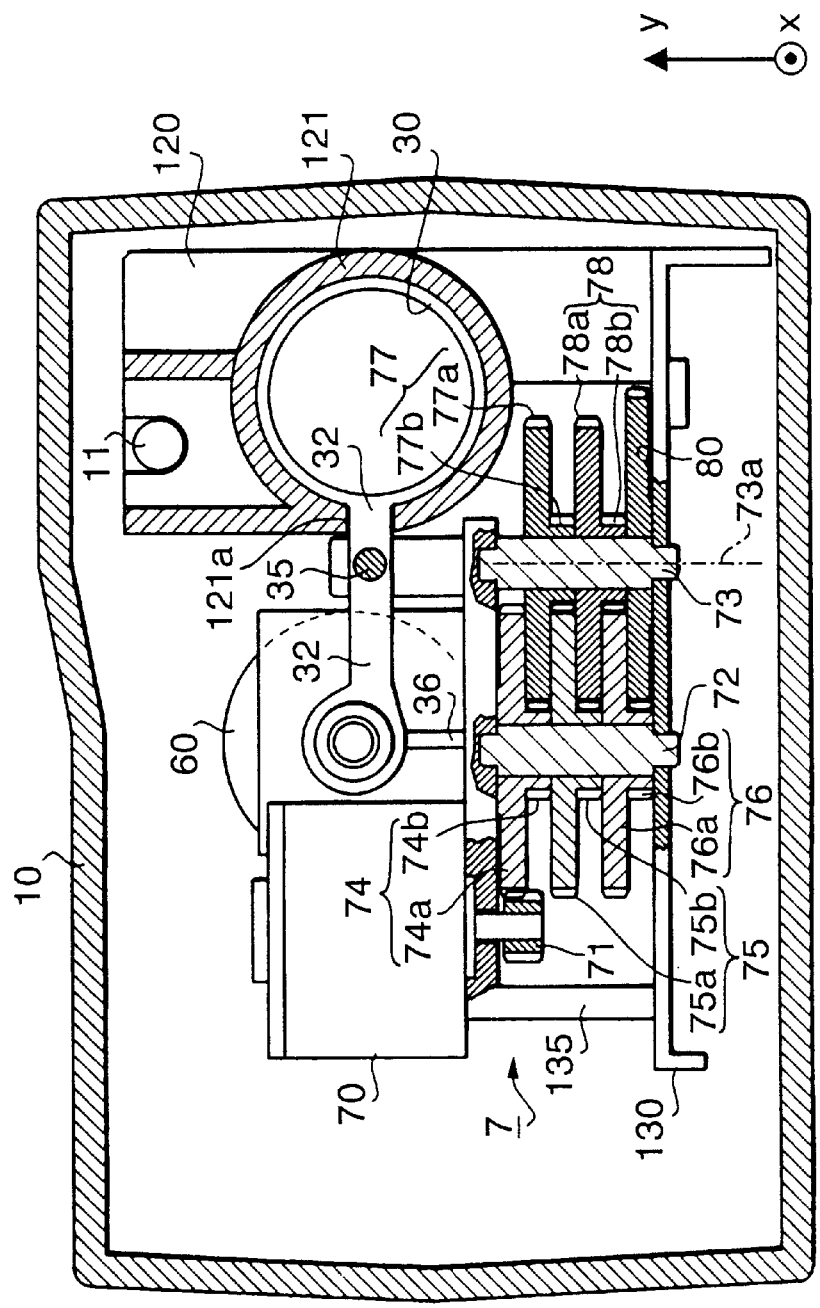
FIG. 5 is a cross-sectional view taken along a line V—V in FIG. 3.

FIG. 5 is a sectional view of the scanner 1 taken along line V—V of FIG. 3. A scanning motor 70 for rotating the scanning mirror 2 is provided on a motor frame 135. To an output shaft of the mirror driving motor 70, a drive gear 71 is secured. In order to reduce the rotation speed of the driving gear 71 to 1/1000 thereof, five reduction gear pairs 74–78 are provided. The gear pairs 74, 75 and 76 are rotatablly supported by a first shaft 72, and the gear pairs 77 and 78 are rotatablly supported by a second shaft 73.

The drive gear 71 engages the large gear 74a of the first gear pair 74. The small gear 74b of the first gear pair 74 engages the large gear 77a of the second gear pair 77. The small gear 77b of the second gear pair 77 engages the large gear 75a of the third gear pair 75. The small gear 75b of the third gear pair 75 engages the large gear 78a of the fourth gear pair 78. The small gear 78b of the fourth gear pair 78 engages the large gear 76a of the fifth gear pair 76. As constructed above, the rotational speed of the scanning motor 70 is reduced with a reduction ratio of 1/1000 to drive a driving member 80 that is engaged with the small gear 76b of the fifth gear pair 76.

A lens driving mechanism 6 will be described.

As shown in FIG. 5; the cylindrical portion 121 of the housing 120 is provided with a groove 121a extending along the X-axis direction. The lens barrel 30 has a first arm 32 extending through the groove 121a to the exterior of the cylindrical portion 121. As shown in FIG. 3, the lens barrel 30 is further provided with a second arm 33, which extends parallel to the first arm 32. A guide bar 35 is provided to guide the lens barrel 30 along the X-axis. The guide bar 35 is inserted through through-holes 32a and 33a respectively formed on the first and second arms 32 and 33.

Figure 6:
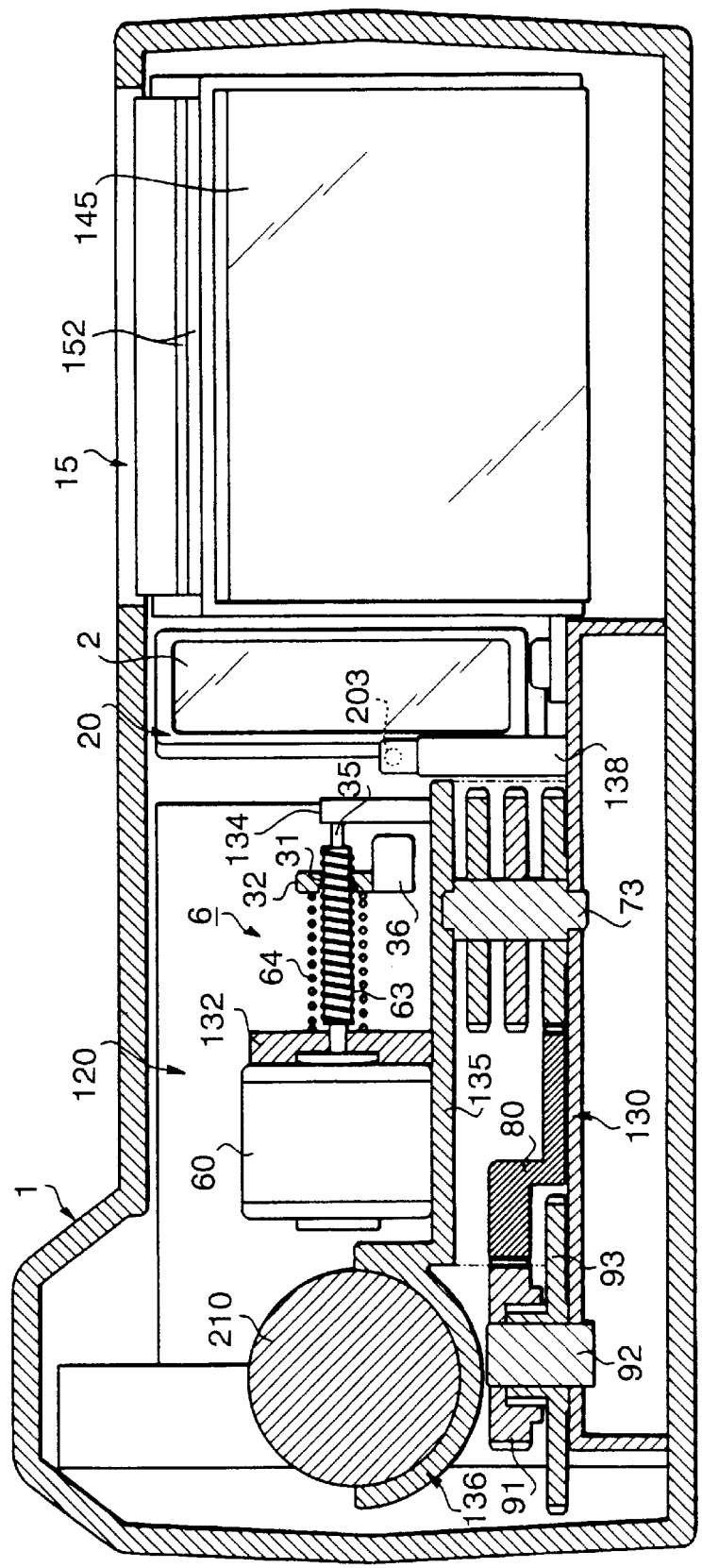
FIG. 6 is a cross-sectional view taken along a line VI—VI in FIG. 3.

FIG. 6 is a sectional view of the scanner 1 taken along a line VI—VI of FIG. 3. An upright frame 132 is provided on the motor frame 135, to which a lens driving motor 60 (which is a stepping motor) is secured. A screw gear 63 is fixed to an output shaft 61 of the lens driving motor 60 (see FIG. 3). The screw gear 63 engages a nut 31 provided to the first arm 32. Thus, the rotation of the driving motor 60 moves the lens barrel 30 along the X-axis. In this embodiment, the stroke of the lens barrel 30 is 6 mm.

In order to set the lens barrel 30 at the lens home position, the first arm is provided with a shutter place 36. When the lens barrel 30 moves to the closest position to the scanning mirror 2, the shutter plate 36 is detected by a lens sensor 203 provided on the support frame 130. The lens sensor 203 is a transmissive type photo sensor, and when the lens barrel 30 is located to the closest position to the scanning mirror 2, the shutter plate 36 shields a detection light of the lens sensor 203. The closest position of the lens barrel 30 with respect to the scanning mirror 2 is defined as a lens home position of the lens barrel 30.

Figure 7:
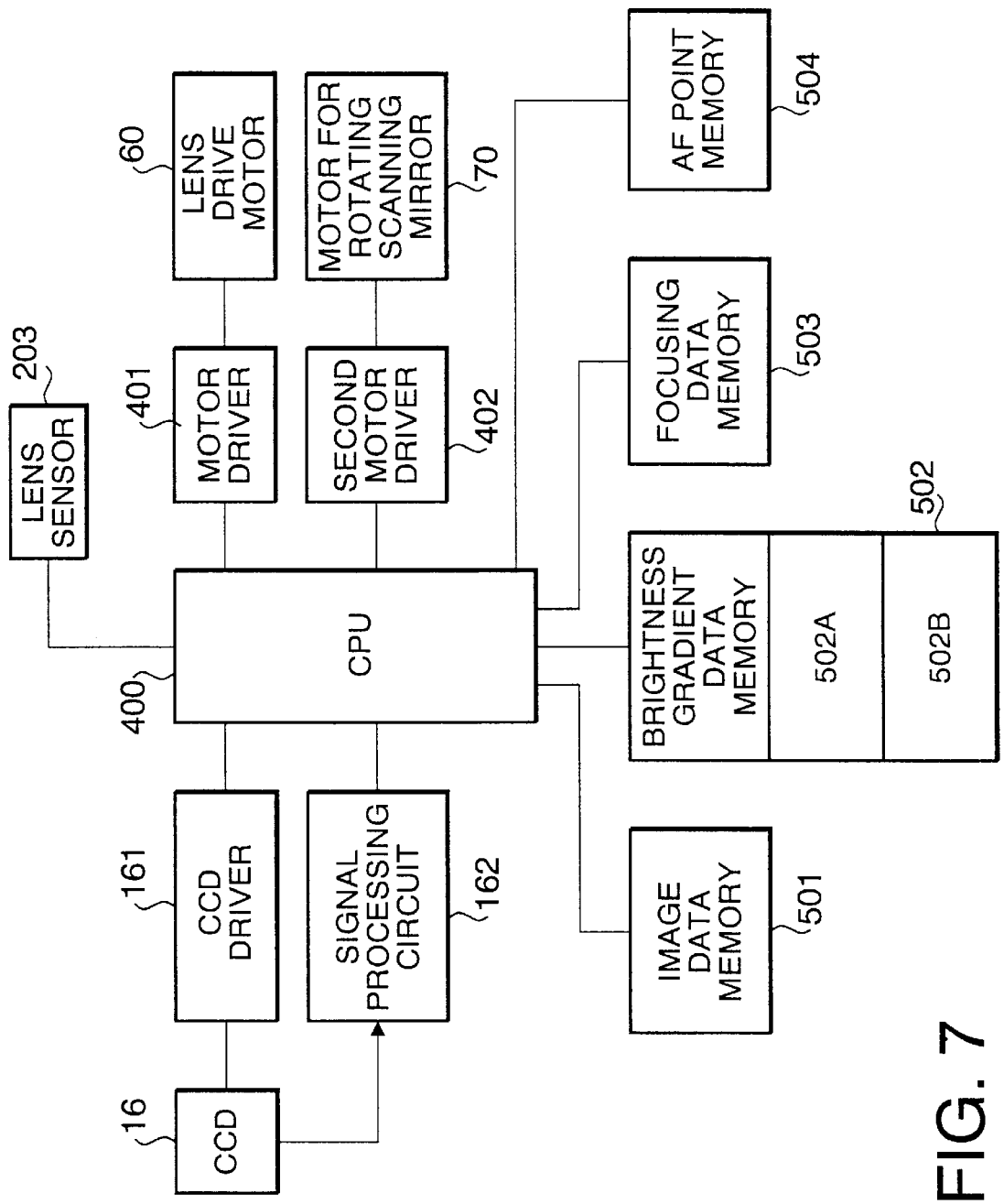
FIG. 7 is a block diagram showing a constitution of a control system of the camera-type scanner shown in FIG. 1.

FIG. 7 is a block diagram schematically illustrating a control system of the automatic focusing device of the scanner 1.

The automatic focusing device of the scanner 1 includes a CPU 400 controlling the entire operation of the scanner 1. To the CPU 400, a CCD driver 161 for driving the image sensor 16, a signal processing circuit 162 for processing an output signal of the image sensor 16, a motor driver 401 for driving the lens drive motor 60 which moves the lens barrel 30, a second motor driver 402 which drives the motor 70 for rotating the scanning mirror 2 are connected. Further, to the CPU 400, an image data memory 501, a brightness gradient data memory 502, a focusing data memory 503 and an AF point memory 504, which will be described later, are connected.

An automatic focusing operation of the scanner 1 will be described.

In this embodiment, when the automatic focusing operation is executed, the scanning mirror 2 is located at the home position.

Figure 8:
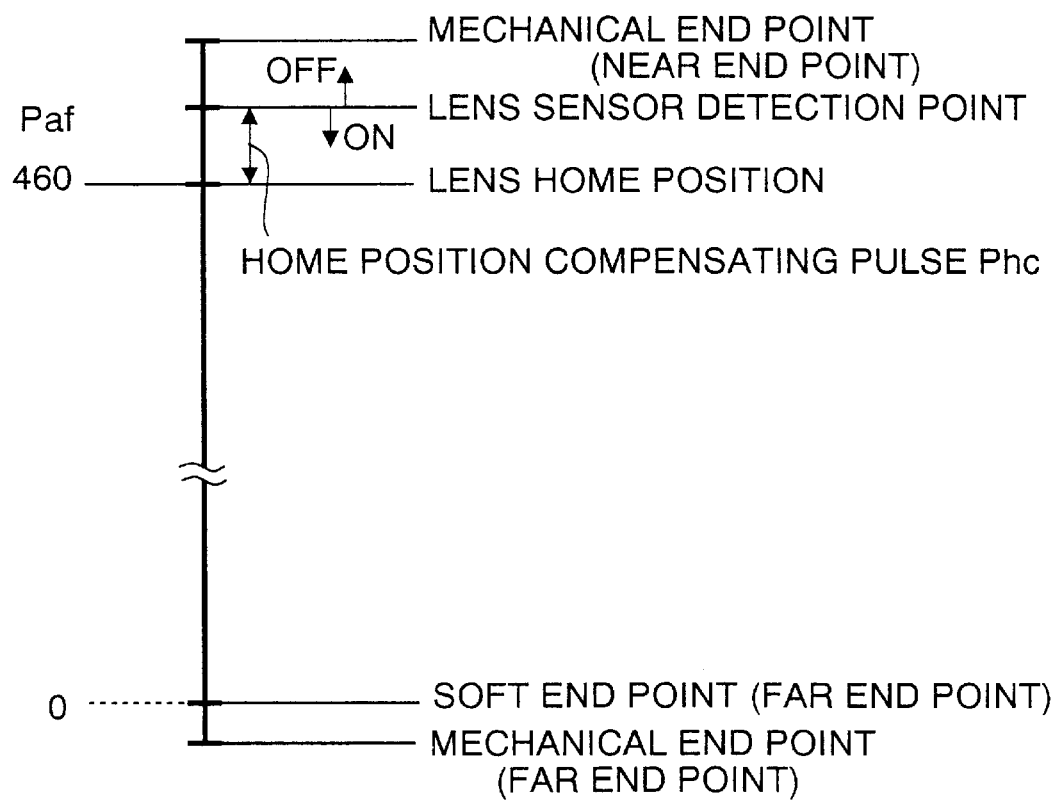
FIG. 8 is a chart showing a relationship between a drive pulse and lens positions.

FIG. 8 shows a relationship between the position of the imaging lens 3 and the number of drive pulses applied to the lens driving motor 60. The imaging lens 3 is movable between mechanical end points: a near end point on the scanning mirror side; and a far end point on the image sensor side. Further, between the mechanical end points, a soft end point and the home position are defined. The movable amount of the lens barrel 30 (i.e., the distance between the mechanical end points) is 6 mm, and the driving steps for moving the image lens 3 within the movable range is 480. Therefore, the lens is moved 12.5 µm per each step (i.e., when one drive pulse is applied to the lens drive motor 60).

In the description hereinafter, the rotation of the. lens drive motor 60 in which the imaging lens 3 is moved towards the near end point is referred to as a forward rotation, and the rotation of the lens drive motor 60 for moving the imaging lens 3 towards the far end point is referred to as a reverse rotation.

The lens home position shown in FIG. 8 is defined as a position of the imaging lens 3 at which an in-focus image of an object apart from the scanner 1 by 23 cm is formed on the image sensor 16. The lens position counter which represents a position of the imaging lens 3 is set to 460 when the imaging lens is located at the home position. The lens position counter is decremented by 1 as the imaging lens 3 is moved towards the far end point side by one step (i.e., one drive pulse for reverse rotation is applied to the lens drive motor 60). When the imaging lens reaches a soft far end point (which is slightly inside of the mechanical far end point), the lens position counter becomes 0.

The lens home position of the imaging lens 3 is determined by rotating the lens driving motor 60 by a lens home position correcting pulse Phc from the switching position of the lens sensor 203. That is, the lens driving motor 60 rotates in reverse by the lens home position correcting pulse Phc after the output of the lens sensor 203 changes from OFF to ON in order to position the imaging lens 3 at the lens home position. The lens home position correcting pulse Phc is set for each scanner to compensate for differences in individual scanners. With this construction, the lens home position of the imaging lens 3 can be accurately determined even if the arrangement of the lens scanner 203 or the shutter plate 36 is different in individual scanners.

FIGS. 9–13 show flowcharts illustrating procedures for executing automatic focusing operation. It should be noted that the procedures are stored as programs to be executed by the CPU 400 in the ROM of the CPU 400. The scanner 1 obtains data related to the focusing condition of imaging lens 3 with respect to an object by using the image sensor 16 which is used for capturing the object image. The focusing condition is detected when the scanning mirror 2 is located at the home position, i.e., when the scan line coincides with the reference scan line.

When the focusing condition is detected, the imaging lens 3 is moved from the near end position towards the far end position by 1 step at a time, and at each movement of the imaging lens 3, the output of the image sensor 16 (i.e., brightness data of each pixel) is obtained. Then, in accordance with the obtained data, contrast (brightness gradient: a difference between brightness data values of two pixels which are adjacent to a certain pixel) of each pixel within a predetermined area is detected. It should be noted that the contrast becomes greatest when the imaging lens 3 is located at the in-focus position, and becomes lower as the imaging lens 3 is moved away from the in-focus position. Therefore, if the imaging lens 3 is moved from the near end position to the far end position, it is possible to determine the lens position at which the contrast with respect to a pixel is the greatest. The lens position thus determined is the in-focus position with respect to the pixel.

Alternatively, a simplified method may be carried out. In the simplified method, the contrast is defined as a difference of the maximum and minimum brightness values of the pixels included in the predetermined area. Then, by moving the imaging lens 3, and the difference (i.e., the contrast) currently obtained and the previously obtained contrast are compared. Initially, the difference (i.e., the contrast) increases since the imaging lens 3 may be away from the in-focus position and may approach the in-focus position as it is moved. At a certain lens position, the contrast decreases. The lens position at which the currently obtained contrast is less than the previously obtained contrast may be determined as the in-focus position. However, in this method, if the object is illuminated with a light source whose brightness varies such as a fluorescent lamp or the like, the maximum and minimum values may vary depending on a timing when the brightness data of each pixel is obtained. In a worse case, the contrast becomes lower than the previously obtained contrast although the imaging lens is not located at the in-focus position.

In order to avoid such a problem, and allow the focusing procedure to be performed accurately, according to the embodiment, with respect to each pixel in the predetermined area, contrast data is obtained. The contrast data corresponds to the contrast, and will be described later. The contrast data with respect to a central pixel of three adjacent pixels is obtained based on brightness data values of two end side pixels of the three adjacent pixels The contrast data is obtained with respect to all of the pixels included in the predetermined area, and a plurality of significant pixels having relatively great contrast data values are determined. Then, change of the contrast data values for each of the plurality of significant pixels in accordance with the change of the lens position is detected. Then, the lens position at which the contrast data value has the greatest value is determined to be the in-focus lens position. It should be noted that when the imaging lens 3 is located at the in-focus lens position, an in-focus image of a portion of an object corresponding to one of the significant pixel which was determined to have the greatest contrast data value is obtained.

The above-described methods for determining the in-focus position of the image lens 3 based on the change of the contrast data in accordance with the change of the lens position can be referred to as a scanning contrast method in comparison with the conventional contrast method in which contrast of the images formed on two image sensors provided at different distances from the imaging lens.

Figure 9:
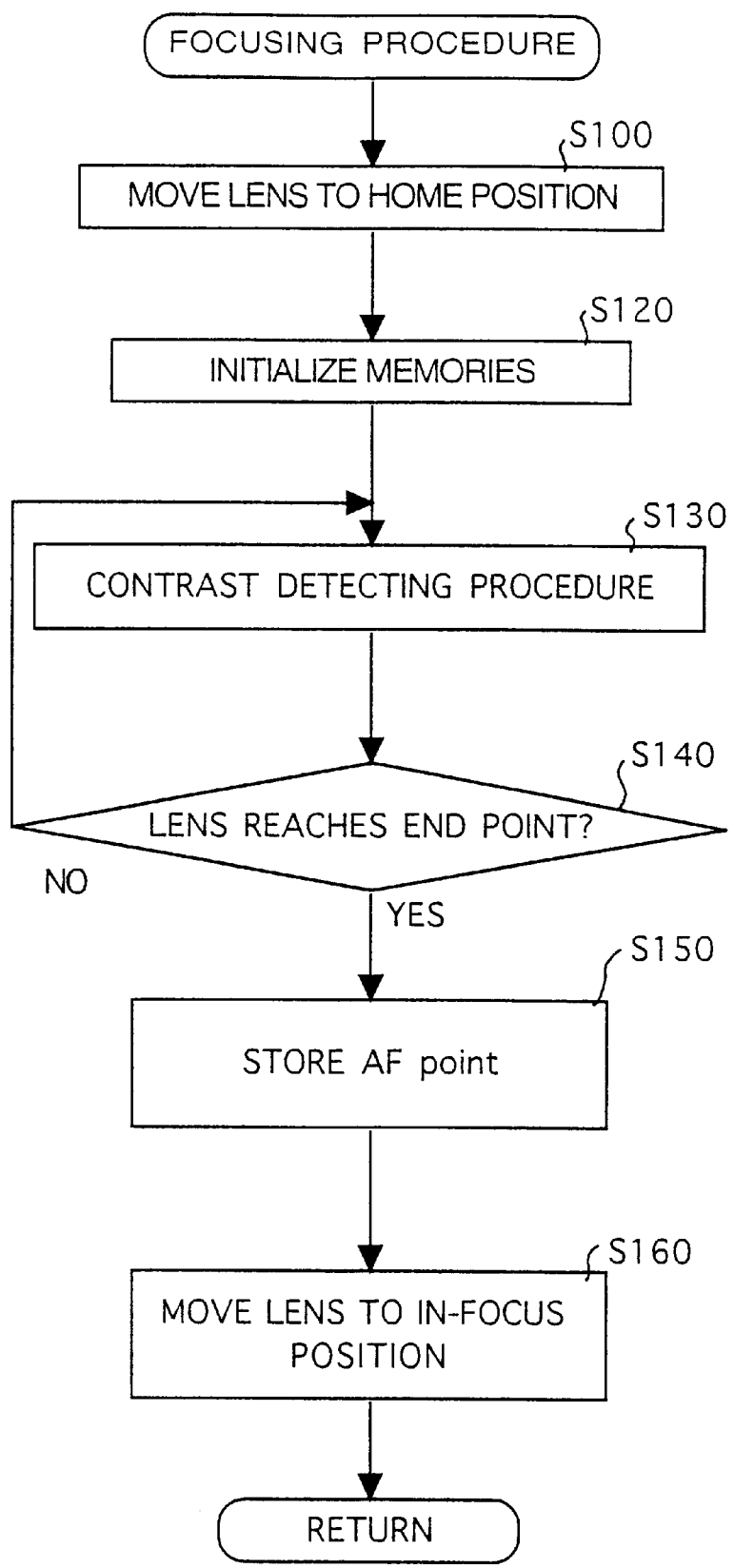
FIG. 9 is a flowchart illustrating a focusing procedure.

FIG. 9 is a flowchart illustrating the focusing procedure. In the focusing procedure, contrast data is detected by moving the imaging lens 3 over the movable range when the scanning mirror 2 is positioned at the home position. Then, based on the detected contrast data, the in-focus position of the imaging lens 3 is determined.

When the focusing procedure is initiated, the CPU 400 moves the imaging lens 3 to the home position (S100), and then initializes the memories which are used in the focusing procedure (S120). Specifically, the image data memory 501, the brightness gradient data memory 502, the focusing data memory 503, and the AF point memory 504 are initialized. It should be noted that the brightness gradient data memory 502 includes a first memory 502A and a second memory 502B.

Figure 10:
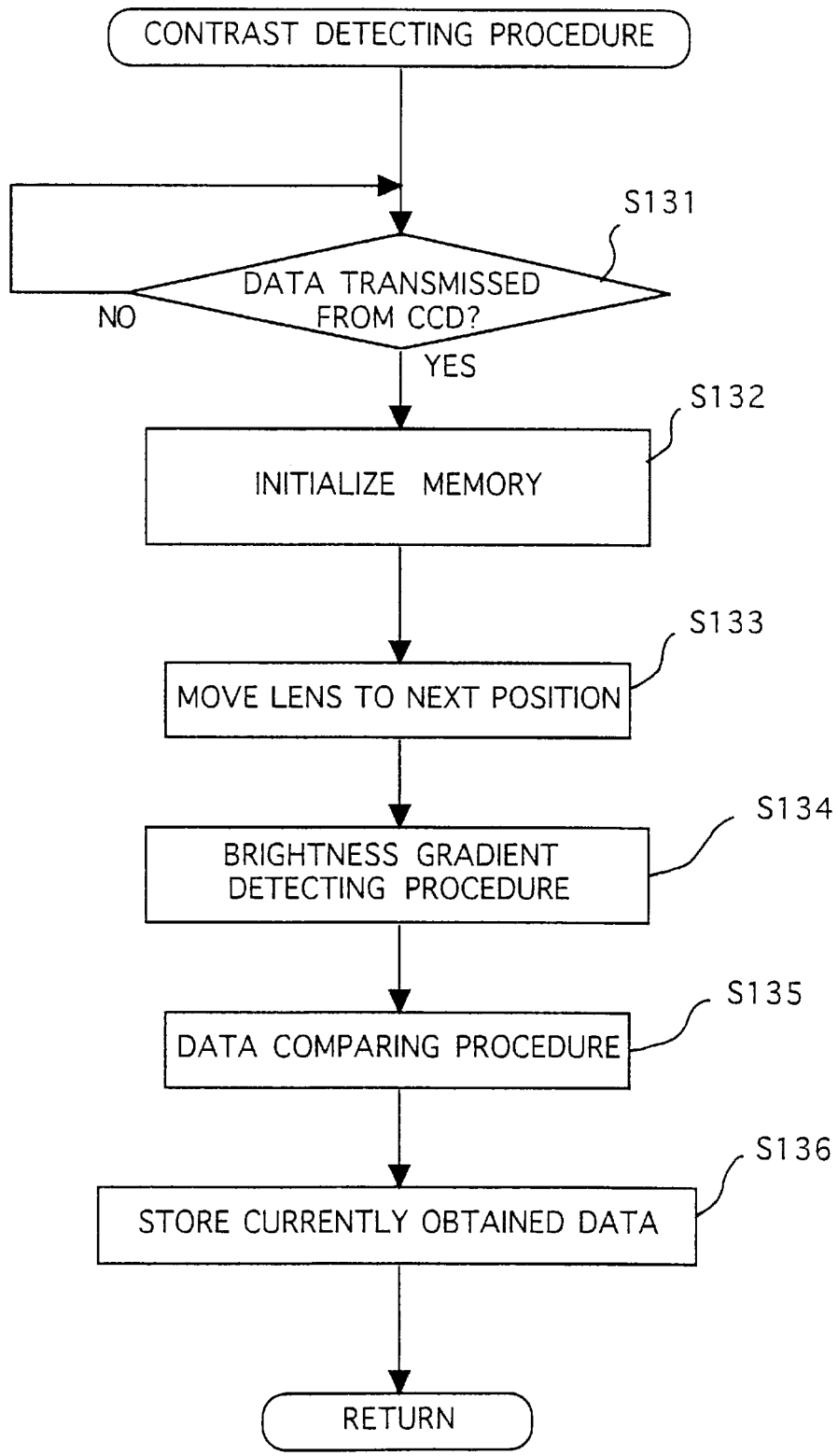
FIG. 10 is a flowchart illustrating a contrast detecting procedure.

The CPU 400 executes, at S130, a contrast detecting procedure shown in FIG. 10. The CPU 400 sequentially locating the imaging lens 3 at each lens position within its movable range and repeatedly executes the contrast detecting procedure (S130 and S140).

FIG. 10 is a flowchart illustrating the contrast detecting procedure.

When the image data signal with respect to a current lens position is transmitted from the image sensor 16 (S131: YES), the CPU 400 firstly clears a storage area in which the contrast data corresponds to the current lens position (S132). In this embodiment, the second memory 502B is used as the storage of the current contrast data. Then, the CPU 400 moves the imaging lens 3 to the next position (S133). At S134, the CPU 400 extracts, from the image data obtained when the imaging lens 3 is located at the previous position, portions of the image at which the contrast changes greatly. This procedure for detecting the portions of which the contrast changes greatly will be described in detail with reference to FIG. 11.

Figure 11:
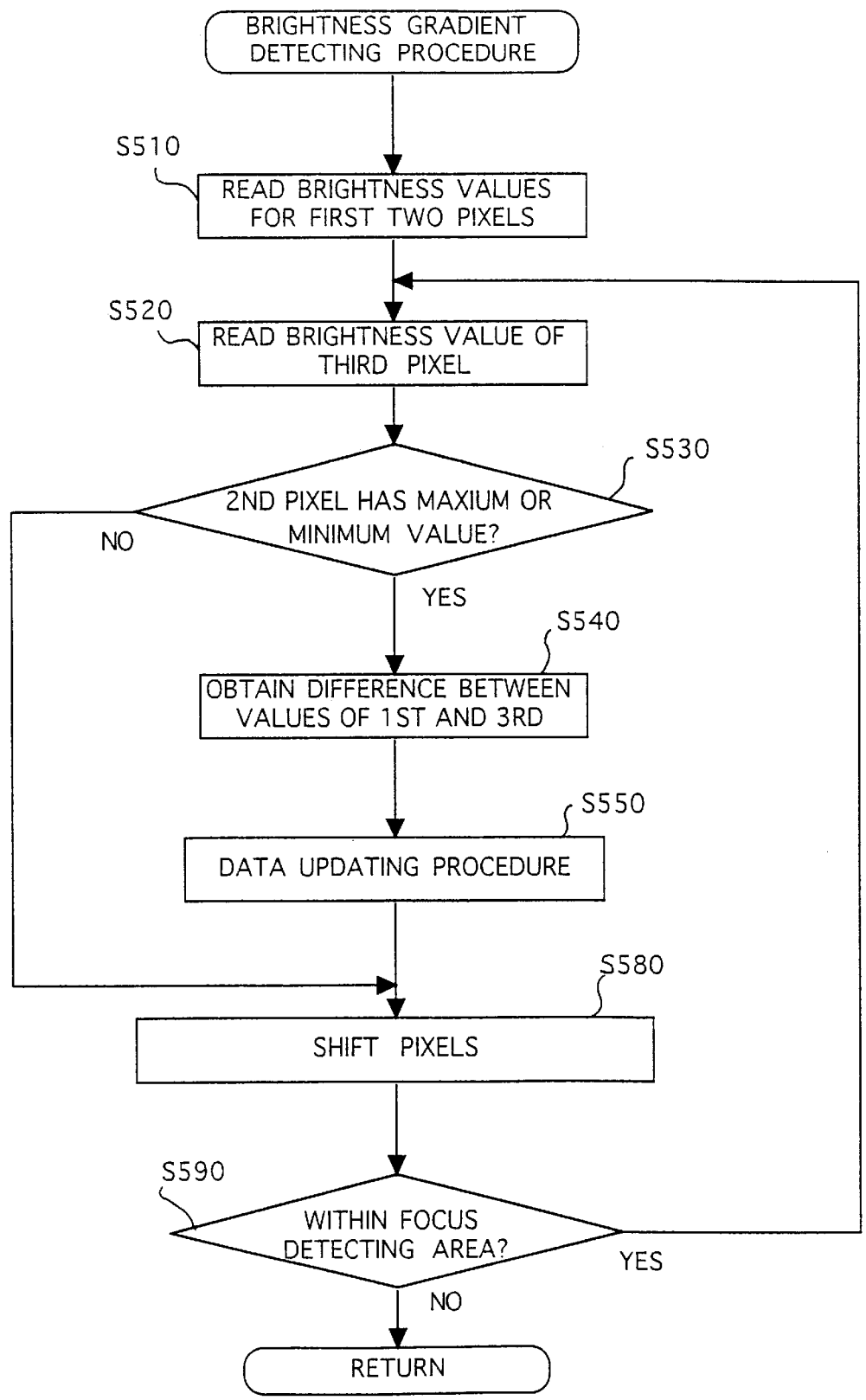
FIG. 11 is a flowchart illustrating a brightness gradient detecting procedure.

FIG. 11 is a flowchart illustrating the brightness gradient detecting procedure for extracting the portions at which the contrast changes greatly. In this procedure, a difference between brightness data values of both side end pixels of three adjoining pixels is defined as a brightness gradient of the central pixel thereof. It should be noted that the brightness gradient is determined only when the brightness values of the three adjoining pixels increase or decrease monotonically.

At S510, brightness data values of first two pixels of a focusing condition detection area are read from the image data memory 501, and at S520, the brightness data values of the third pixel is read. In this embodiment, the focusing condition detection area is defined as central 1000 pixels among 2088 pixels of the image sensor 16. In other words, with respect to the image formed on the central 1000 pixels of the image sensor 16, the focusing condition is detected.

At S530, it is determined whether the data value of the second pixel among the data values of the adjoining three pixels is a maximum or minimum value. If the data value of the second pixel is the maximum or minimum value, the data values of the three adjoining pixels do not increase or decrease monotonically. In this case (S530: NO), control proceeds to S580.

If the data value of the second pixel is not the maximum or minimum value among the data values of the three adjacent pixels, the data values of the three adjacent three pixels increase or decrease monotonically. In this case (S530: YES), a difference Δ between the data values of the first pixel and the third pixel is calculated, which is used as a brightness gradient value with respect to the second pixel (S540). Then, at S550, the data updating procedure is executed, which will be described below.

Figure 12:
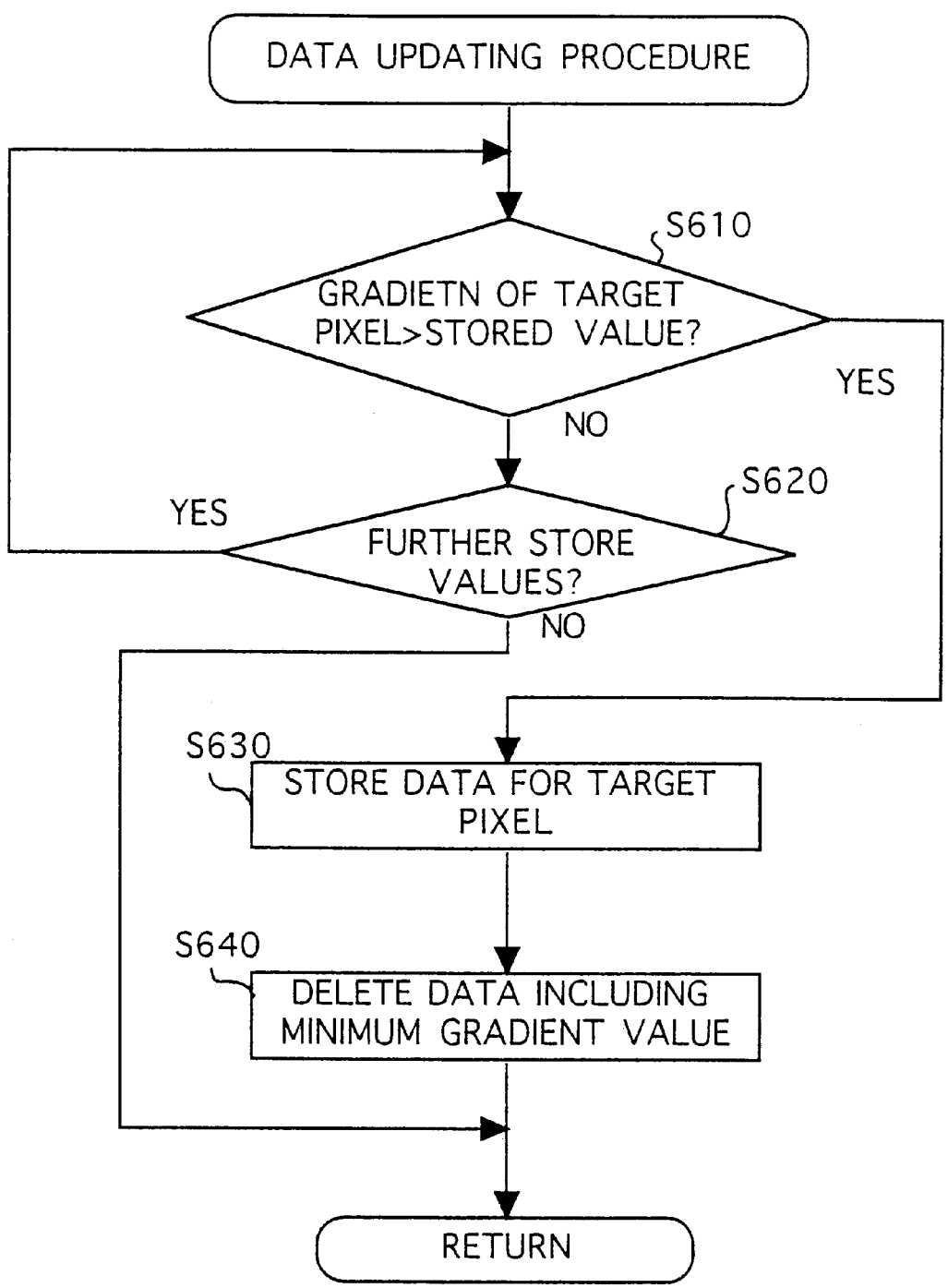
FIG. 12 is a flowchart illustrating a data updating procedure.

FIG. 12 is a flowchart illustrating the data updating procedure which is called at S550 of the brightness gradient detecting procedure.

At S610, the brightness gradient value of the second pixel (which will be referred to as a target pixel hereinafter) of the currently examined three adjacent pixels is compared with the brightness gradient values of the same pixel which have been obtained previously at different lens positions and stored in the second memory 502B. In the second memory 502B, a first to N-th brightness gradient data corresponding to a first to N-th different lens positions are stored. The brightness gradient value currently obtained is compared with each of the first to N-th brightness gradient value corresponding to each lens position. It should be noted that the currently obtained brightness gradient data value has not yet stored in the second memory area 502B at this stage, and will be stored at S630 Further, value 0 (zero) is stored as the brightness gradient data value corresponding to the lens positions at which the imaging lens 3 has not yet reached.

If the currently obtained brightness gradient value is greater than at least one of the stored values (S610: YES), the currently obtained brightness gradient value, the position of the target pixel, with respect to which the currently obtained brightness gradient value has been obtained, the brightness data values of the pixels next to the target are stored in the second memory 502B (S630) as brightness gradient data with respect to the target pixel.

At S640, within the first to N-th data, a brightness gradient data whose brightness gradient value (absolute value) is smallest is deleted. Thus. in the second memory 502B, the brightness gradient data having a first to N-th greatest brightness gradient values are stored.

If the absolute value of the currently obtained brightness gradient value is smaller than all of the brightness gradient values of the first to N-th brightness gradient data stored in the second memory 502B, the brightness gradient data with respect the current target pixel will not be stored, the target pixel is shifted to a pixel next to the current target pixel (S580 of FIG. 11), and the above-described procedure is repeated while the target pixel is included within the focus condition detecting area.

In the embodiment, the number of the brightness gradient data to be stored in the memory 502 is i, and all the data are set to 0 (zero) when the initialization at S120 is performed. Thus, with respect to the first N data, value 0 (zero) is replaced with the actual brightness gradient data as the procedure is executed.

As described above, if the absolute value of the currently obtained brightness gradient value is less than the brightness gradient values of all of the stored data, the brightness gradient data with respect to the current target pixel will not be stored, i.e., the stored data will not be updated, and control proceeds from S620 to S580 of FIG. 11.

At S580, as described above. the pixels for which the brightness gradient value is calculated are shifted by one pixel. As far as a target pixel is included in the focusing range (S590: YES), the procedure of S520 through S590 is repeated. As a result of this procedure, data corresponding to the pixels having the first to N-th greatest brightness. gradient values among all the pixels within the focus condition detecting area are stored in the second memory area 502B.

When the procedures for updating the data (i.e., the brightness gradient detecting procedure and the data updating procedure) described above are finished (S590: NO), control proceeds to S135 of FIG. 10, at which a data comparing procedure is called.

Figure 13:
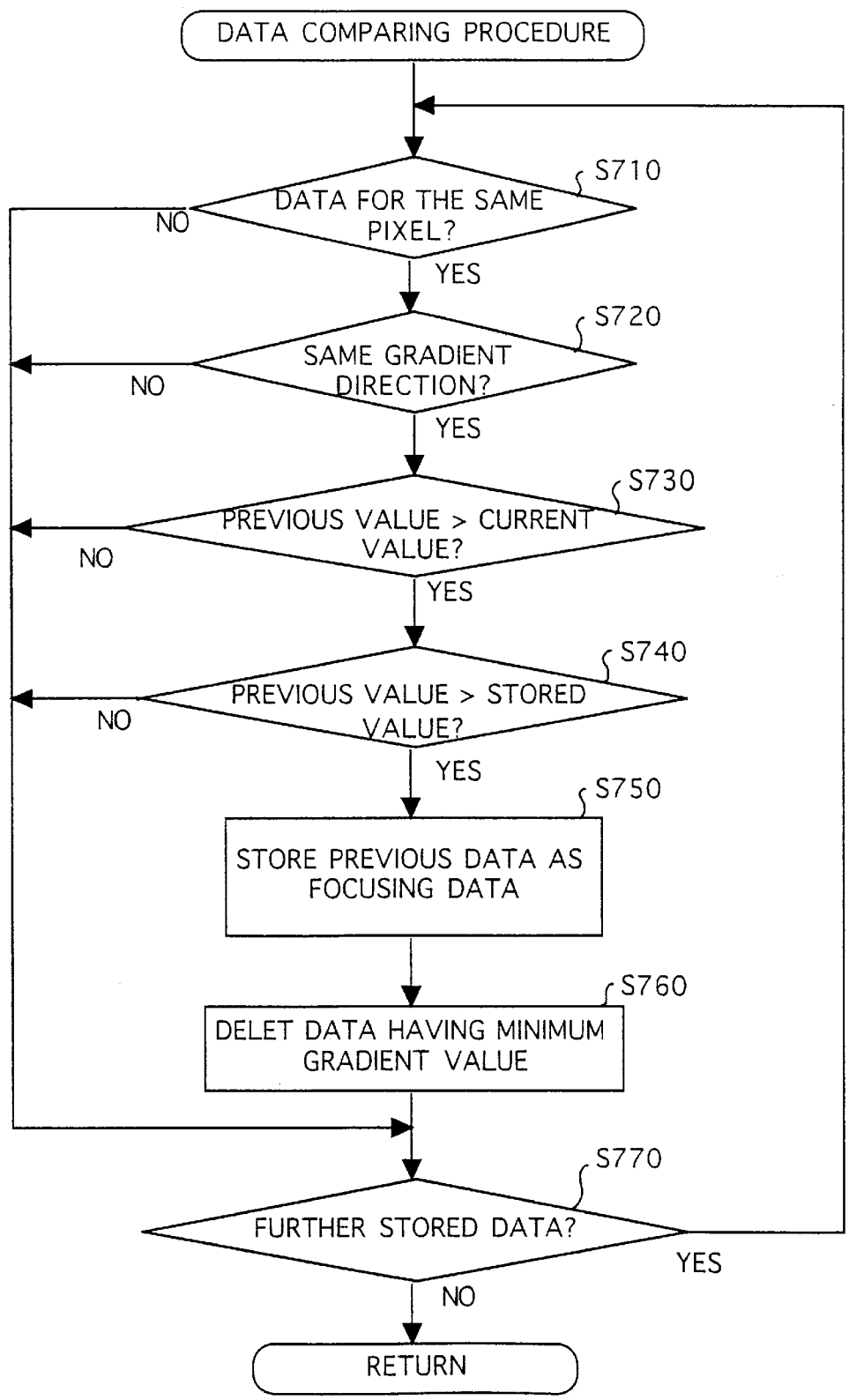
FIG. 13 is a flowchart illustrating a data comparing procedure for comparing data of a previous lens position and a current lens position.

FIG. 13 is a flowchart illustrating the data comparing procedure. In the first memory 502A, previously obtained first to N-th brightness gradient data are stored. In the second memory 502S, the currently obtained first to N-th brightness gradient data are stored. In the data comparing procedure, the previously obtained data stored in the first memory 502A and the currently obtained data stored in the second memory 502B are compared.

In the following description, the previously stored data are indicated by P1–Pn, and the currently stored data are indicated as C1–Cn. Firstly, data C1 and P1 are compared. At S710, it is determined whether data C1 and P1 are data with respect to the same target pixel. If the data C1 and P1 are not the data with respect to the same pixel (S710: NO), control proceeds to S770 where it is determined whether there remains data which has not yet compared with the currently obtained data in the first area 502A. At this stage, since comparison is made between the data C1 and P1, data P2–Pn have not yet been compared with data C1 (S770: YES) Thus, control proceeds to S710, and then data C1 and P2 are compared.

After the data C1 is compared with each of the data P1–Pn, data C2 is compared with each of the data P1–Pn. It should be noted that, if, for example, the data C1 and P2 are the data with respect to the same pixel, in the succeeding comparing procedure, C2 is compared with each of P1 and P3–Pn.

As an example, it is assumed that the data C3 and P4 are data for the same pixel and have the brightness gradient in the same direction.

In this case, at S710 and at S720, determination is made to be YES. At S730, it is determined whether previously obtained brightness gradient value is greater than the currently obtained brightness gradient value. If the previously obtained brightness gradient value is not greater than the currently obtained brightness gradient value (S730: NO), the data will not be stored, and control proceeds to S770.

If the previously obtained brightness gradient value is greater than the currently obtained one (S730: YES), then it is determined whether the previously obtained brightness gradient value is greater than at least one of the brightness gradient values of stored focusing data (S740). The stored focusing data will be described later If the previously obtained brightness gradient data is not greater than at least one of the stored data (S740: NO), control proceeds to S770. If the previously obtained brightness gradient data is greater than at least one of the stored data (S740: YES), the previously obtained data is stored in the focusing data memory 503 as one of first to K-th focusing data, and within the first to K-th data stored in the memory 503, data having the least brightness gradient value is deleted (S760). In other words, if the previously obtained brightness gradient value is greater than at least the smallest one of the stored data, the data stored in the focusing data memory 503 is updated. Similar to the above, each of the previously obtained data P1 through Pn is compared with each of the data C1 through Cn, and the focusing data, the number of which is K, is stored as the focusing data. In other words, the first to K-th focusing data which have been decided to have greater brightness gradient values than the other data are stored in the focusing data memory 503.

When the procedure shown in FIG. 13 is finished, control proceeds to S136 of FIG. 10, where the currently obtained data (i.e., the brightness gradient data) is stored in the first area 502A. When the data is stored at S136, control proceeds to S140 of FIG. 9. Steps S130 and S140 are repeated until the imaging lens 3 reaches the end point. At each lens position, the contrast data (i.e., the brightness gradient data for each pixel within the focusing range) is detected, and the focusing data is stored, if necessary, in the focusing data memory 503.

When the lens has reached the end point (S140: YES), the lens position at which the brightness gradient data value is the greatest is determined based on the focusing data stored in the focusing data memory 503. The position determined as above is determined to be the in-focus position of the imaging lens 3, and the in-focus position is stored as the AF point (S150) in the AF point memory 504.

The CPU 400 then controls the lens drive motor 60 (S160) to locate the imaging lens 3 at the in-focus position, i.e., the position indicated by the AF point. It should be noted that if there are a plurality of positions at which the brightness gradient data values have the maximum value, the lens positions corresponding to the maximum value are averaged and stored as the AF point.

As described above, according to the embodiment, the focusing data is detected over the entire movable range of the imaging lens 3. Therefore, an erroneous detection of the focusing point due to temporary fluctuation of the light source can be prevented. Further, based on the focusing data within a predetermined range, weighting is applied to the data before the in-focus position of the lens is determined.

Furthermore, in the embodiment, 1000 pixels at the central area are used for detecting the in-focus position. However, if the contrast in the central area is relatively small, by providing a further focusing range at a peripheral portion, it may be possible to obtain the in-focus position of the lens with respect to an object located at a peripheral portion.

As described above, according to the present invention, the imaging optical system for capturing an object image can also be used as the focus condition detecting system. Thus, it becomes unnecessary to provide a separate focus detecting system, and accordingly it becomes possible to make the scanner compact. Further, over the movable range of the imaging lens, and with respect to all the pixels within a focus detecting area, the brightness gradient data values are detected. Therefore, the in-focus position can be detected accurately without being affected by a temporary fluctuation of the illumination.

The present disclosure relates t-o the subject matter contained in Japanese Patent Application No. HEI 09-311172, filed on Oct. 28, 1997, which is expressly incorporated herein by reference in its entirety.

What is claimed is:

1. A focusing system of a scanner, comprising:
   an imaging lens;
   a line image sensor having a plurality of pixels arranged in a line for capturing a one-dimensional image, said one-dimensional image being a part of an image formed by said imaging lens;
   a lens drive system that drives said imaging lens with respect to said image sensor within a predetermined movable range;
   a contrast data detecting system that detects a contrast data representing brightness gradient with respect to a pixel located in a predetermined area on said line image sensor;
   a lens position detecting system that controls said lens drive system to sequentially change a position of said imaging lens within said predetermined movable range and controls said contrast data detecting system to repeatedly detects contrast data at each position of said imaging lens, said lens position detecting system detects a pixel with respect to which the brightness gradient is greatest and a lens position when said brightness gradient of said pixel is greatest; and
   a controller that controls said lens drive system to locate said imaging lens at said position detected by said lens position detecting system.

2. The focusing system according to claim 1, wherein said lens drive system moves said imaging lens in a direction of an optical axis of said imaging lens.

3. The focusing system according to claim 2, wherein said lens drive system moves said imaging lens stepwisely at a predetermined pitch from a first end to a second end within said movable range.

4. The focusing system according to claim 3, wherein said first end is a near end point of said imaging lens, and wherein said second end is a far end point of said imaging lens.

5. The focusing system according to claim 1, wherein said brightness gradient with respect to a pixel is a difference between brightness values of two pixels adjacent to said pixel, and wherein said contrast detecting system detects said brightness gradient only when brightness values of said pixel and said two adjacent pixels change monotonically.

6. The focusing system according to claim 1, wherein said lens position detecting system includes a brightness gradient data memory for storing a brightness gradient value, a pixel with respect to which said brightness gradient value is detected, and a position at which said brightness gradient value is detected, for each of a predetermined number of brightness values whose values are greater than the other of brightness gradient values which have been detected, and wherein said lens position detecting system detects a position of said imaging lens at which the brightness gradient value is the greatest as said in-focus position of said imaging lens.

7. A scanner, comprising:

an imaging lens;

a line image sensor having a plurality of pixels arranged in a line for capturing a one-dimensional image, said one-dimensional image being a part of an image formed by said imaging lens;

a lens drive system that drives said imaging lens with respect to said image sensor within a predetermined movable range;

a contrast data detecting system that detects a contrast data representing brightness gradient with respect to a pixel located in a predetermined area on said line image sensor;

a lens position detecting system that controls said lens drive system to sequentially change a position of said imaging lens within said predetermined movable range and controls said contrast data detecting system to repeatedly detects contrast data at each position of said imaging lens, said lens position detecting system detects a pixel with respect to which the brightness gradient is greatest and a lens position when said brightness gradient of said pixel is greatest;

a controller that controls said lens drive system to locate said imaging lens at said position detected by said lens position detecting system;

a rotatable mirror provided between said object and said imaging lens, said rotatable mirror being rotatable about an axis extending in a direction parallel to a direction in which said plurality of pixels are arranged, wherein light from a part of said object is reflected by said rotatable mirror and incident on said image sensor through said imaging lens, two-dimensional image of said object being captured as said rotatable mirror is rotated.

8. The scanner according to claim 7, wherein said lens position detecting system detects said position of said imaging lens with said rotatable mirror located at a predetermined reference position.

9. The scanner according to claim 8, wherein said predetermined reference position of said rotatable mirror is a position at which an optical axis of said imaging lens intersects a reflection surface of said rotatable mirror at 45 degrees.

* * * * *